(12) United States Patent
Tomescu

(10) Patent No.: US 11,148,669 B2
(45) Date of Patent: Oct. 19, 2021

(54) METHOD AND DEVICE FOR SUPPORTING A LANE CHANGE FOR A VEHICLE

(71) Applicant: Continental Automotive GmbH, Hannover (DE)

(72) Inventor: Victor Tomescu, Friedrichshafen (DE)

(73) Assignee: Continental Automotive GmbH, Hannover (DE)

(*) Notice: Subject to any disclaimer, the term of this patent is extended or adjusted under 35 U.S.C. 154(b) by 19 days.

(21) Appl. No.: 16/070,441

(22) PCT Filed: Nov. 24, 2016

(86) PCT No.: PCT/EP2016/078657
§ 371 (c)(1),
(2) Date: Jul. 16, 2018

(87) PCT Pub. No.: WO2017/125184
PCT Pub. Date: Jul. 27, 2017

(65) Prior Publication Data
US 2019/0329780 A1    Oct. 31, 2019

(30) Foreign Application Priority Data

Jan. 19, 2016 (EP) .................................... 16465502

(51) Int. Cl.
*B60W 30/18* (2012.01)
*B60W 50/14* (2020.01)
(Continued)

(52) U.S. Cl.
CPC ...... *B60W 30/18163* (2013.01); *B60W 30/09* (2013.01); *B60W 50/14* (2013.01);
(Continued)

(58) Field of Classification Search
None
See application file for complete search history.

(56) References Cited

U.S. PATENT DOCUMENTS 9,487,139 B1* 11/2016 Ishida ................... B60W 30/09
2004/0016870 A1* 1/2004 Pawlicki .................. G06T 7/73
250/208.1

(Continued)

FOREIGN PATENT DOCUMENTS

CN    102963361 A    3/2013
CN    103802829 A    5/2014
(Continued)

OTHER PUBLICATIONS

International Search Report of the International Searching Authority for International Application PCT/EP2016/078657, dated Mar. 3, 2017, 3 pages, European Patent Office, HV Rijswijk, Netherlands.

(Continued)

*Primary Examiner* — Peter D Nolan
*Assistant Examiner* — Demetra R Smith-Stewart
(74) *Attorney, Agent, or Firm* — W. F. Fasse

(57) ABSTRACT

A method for providing lane change assistance information to the driver of a subject vehicle moving on a lane of a roadway in a driving direction, includes the following steps: detecting another vehicle which is approaching the subject vehicle; checking whether changing to another lane of the same roadway is possible and permissible for the subject vehicle; and informing the driver of the subject vehicle that the other vehicle is approaching to trigger a manual lane change, or initiating an automatic lane change of the subject vehicle, when the lane change to the other lane is possible and permissible.

19 Claims, 6 Drawing Sheets

(51) Int. Cl.
    *B62D 15/02*     (2006.01)
    *G08G 1/16*     (2006.01)
    *B60W 30/09*     (2012.01)

(52) U.S. Cl.
    CPC ....... *B62D 15/029* (2013.01); *B62D 15/0255* (2013.01); *G08G 1/162* (2013.01); *G08G 1/167* (2013.01); *B60W 2050/143* (2013.01)

(56) References Cited

U.S. PATENT DOCUMENTS

| | | | |
|---|---|---|---|
| 2010/0179719 A1* | 7/2010 | Kimura | B60K 26/021 701/29.1 |
| 2011/0130936 A1* | 6/2011 | Noda | G08G 1/163 701/70 |
| 2013/0057397 A1* | 3/2013 | Cutler | B62D 15/0255 340/435 |
| 2015/0151725 A1* | 6/2015 | Clarke | B60W 40/06 701/28 |
| 2015/0161894 A1* | 6/2015 | Duncan | G06K 9/00845 701/1 |
| 2015/0161895 A1* | 6/2015 | You | G08G 1/167 701/70 |
| 2015/0291158 A1* | 10/2015 | Okita | B60W 30/09 701/1 |
| 2015/0321699 A1* | 11/2015 | Rebhan | B62D 15/0255 701/23 |
| 2016/0240084 A1* | 8/2016 | Takeuchi | B60T 17/22 |
| 2016/0284218 A1* | 9/2016 | Ejiri | G08G 1/166 |
| 2017/0355368 A1* | 12/2017 | O'Dea | G05D 1/0088 |
| 2017/0369055 A1* | 12/2017 | Saigusa | G08G 1/0116 |

FOREIGN PATENT DOCUMENTS

| | | |
|---|---|---|
| CN | 105882518 A | 8/2016 |
| DE | 102005023185 | 11/2006 |
| DE | 102007033887 | 9/2008 |
| DE | 102009023444 | 1/2010 |
| DE | 102012215173 | 3/2013 |
| JP | 2000-242896 A | 9/2000 |
| JP | 2005-062912 A | 3/2005 |
| JP | 2005-310010 A | 11/2005 |
| JP | 2008-162553 A | 7/2008 |
| JP | 2014-191632 A | 10/2014 |
| JP | 2016-009200 A | 1/2016 |
| WO | WO 2006/122867 | 11/2006 |
| WO | WO 2014/204381 | 12/2014 |

OTHER PUBLICATIONS

PCT International Preliminary Report on Patentability of the International Searching Authority for International Application PCT/EP2016/078657, dated May 8, 2018, 6 pages, European Patent Office, HV Rijswijk, Netherlands.

Extended European Search Report and Examination Report for European Patent Application No. EP 16 46 5502, dated Jul. 6, 2016, 10 pages, The Hague, Netherlands, with partial English translation, 8 pages.

Partial English Summary of Japanese Office Action in Japanese Patent Application No. 2018-536406, dated Sep. 2, 2020, 4 pages.

Chinese Office Action and Search Report in Chinese Patent Application No. 201680079357.0, dated Dec. 2, 2020, 8 pages, with English Partial Summary (1 page).

Japanese Office Action in Japanese Patent Application No. 2018-536406, dated May 6, 2021, with English Partial Summary, 2 pages.

Chinese Office Action and Search Report in Chinese Patent Application No. 201680079357.0, dated May 31, 2021, 8 pages, with English Partial Summary, 2 pages.

\* cited by examiner

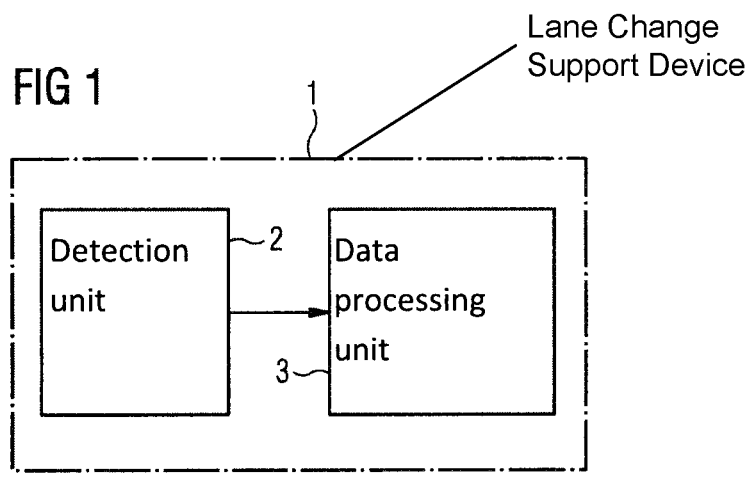
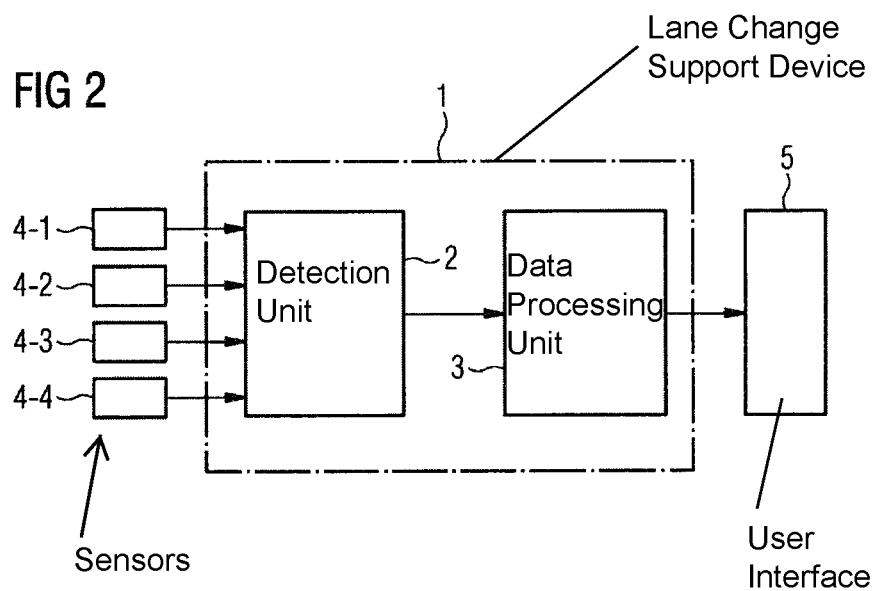

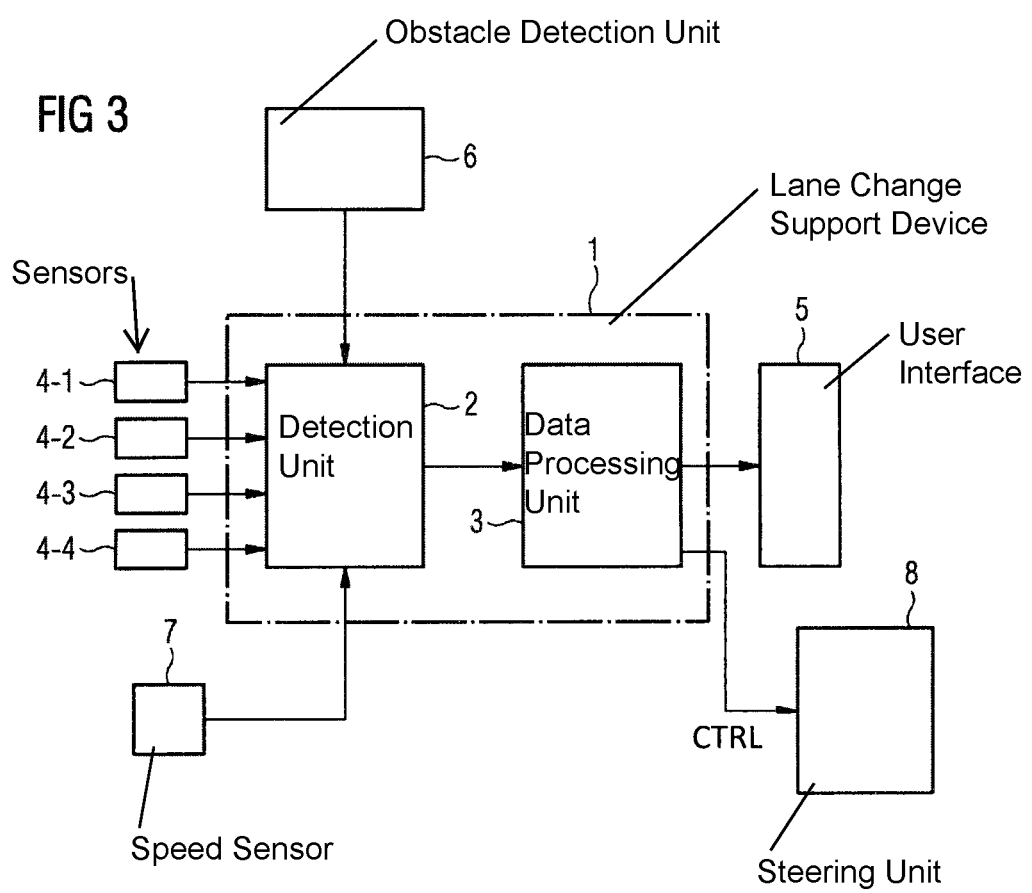

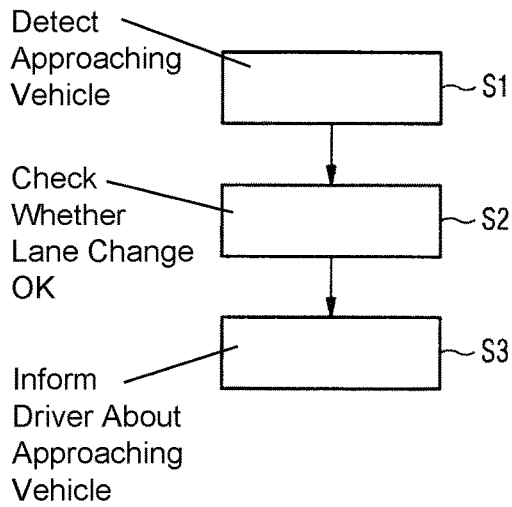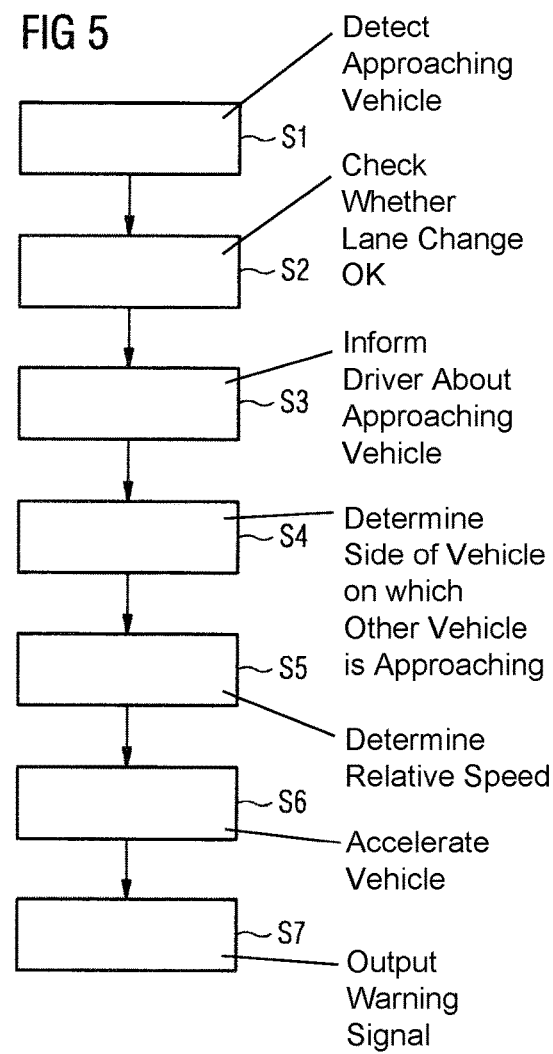

METHOD AND DEVICE FOR SUPPORTING A LANE CHANGE FOR A VEHICLE

FIELD OF THE INVENTION

The invention relates to a method and a device for supporting a lane change for a vehicle moving in a driving direction along a lane on a roadway.

BACKGROUND INFORMATION

In many driving situations, it is necessary for a vehicle moving on a lane of a roadway to make a lane change. If, for example, a vehicle is moving on a multi-lane highway, it is essential for the vehicle to make a lane change to another lane of the highway if another vehicle on the same lane is approaching the vehicle from behind at a higher driving speed. As a result of a prompt lane change by the vehicle driving in front, the probability of a collision of the two vehicles is reduced and, as a consequence, safety is increased for all road users.

In conventional vehicles, a driver recognizes an approaching vehicle, for example by looking at a rear-view mirror or a side mirror, and can make an appropriate lane change. However, a situation can occur in which a driver is distracted due to the traffic situation or is not looking at the rear-view mirror of his vehicle for other reasons and, consequently, possibly does not notice a vehicle approaching fast from behind or only does so too late to be able to make a lane change to another lane promptly. In this case, the driver of the approaching vehicle has to slow down his vehicle in order to avoid a collision with the vehicle driving in front. The braking maneuver impedes the flow of traffic on the roadway, possibly resulting in a chain reaction of braking maneuvers, which can lead to a traffic jam on the roadway, for example. In addition, a situation can occur in which an approaching vehicle, whether intentionally or unintentionally, does not observe the minimum distance, thus creating the risk of a pileup.

SUMMARY OF THE INVENTION

It is therefore an object of the present invention to provide a method and a device for increasing driving safety in road traffic.

This object can be achieved according to the invention in a method having the features as set forth herein.

The invention accordingly provides a method for supporting a lane change for a vehicle moving in a driving direction along a roadway, wherein the method has the following steps:
detecting another vehicle which is approaching the vehicle, checking whether changing to another lane on the same roadway is possible and permissible for the vehicle as soon as an approaching vehicle is detected; and
informing the driver of the vehicle about the other approaching vehicle in order to trigger a manual or autonomous lane change of the vehicle if a lane change to another lane of the same roadway is possible and permissible.

In one possible embodiment of the method according to the invention, the side of the body of the vehicle which the other detected vehicle is approaching is additionally ascertained.

In another possible embodiment of the method according to the invention, it is checked whether a free lane exists on the right side on the same roadway in the driving direction of the moving vehicle if it is ascertained that the side of the body of the vehicle which the other vehicle is approaching is the back of the vehicle.

In this case, the driver of the vehicle is preferably informed about the vehicle approaching his vehicle from behind and is prompted to make a lane change to the free lane of the roadway.

In another possible embodiment of the method according to the invention, it is checked whether another lane exists in the same driving direction of the moving vehicle and, if this is the case, it is further checked whether an obstacle is present which would prevent a lane change of the vehicle to the other lane concerned of the roadway.

In another possible embodiment of the method according to the invention, a relative speed is calculated between a measured driving speed of the vehicle and a measured driving speed of the other vehicle.

In another possible embodiment of the method according to the invention, the driver of the vehicle is informed about the calculated relative speed between the ego vehicle and the other approaching vehicle by means of a user interface.

In another possible embodiment of the method according to the invention, a lane change of the vehicle to a free lane of the same roadway is proposed or executed as a function of the calculated relative speed between the vehicle and the other approaching vehicle.

In another possible embodiment of the method according to the invention, the vehicle is accelerated prior to and/or during the lane change of the vehicle to the free lane if the calculated relative speed between the vehicle and the other detected vehicle, which is approaching the vehicle from behind, exceeds a predetermined threshold, in order to prevent a collision between the two vehicles.

In another possible embodiment of the method according to the invention, a warning signal is output by the vehicle prior to and/or during the lane change if the calculated relative speed between the vehicle and the other detected vehicle, which is approaching the vehicle from behind, exceeds a predefined threshold, in order to prevent a collision between the two vehicles.

The invention further provides a device for supporting a lane change, having the features set forth herein.

The invention accordingly provides a device for supporting a lane change for a vehicle moving in a driving direction along a roadway, wherein the device has:
a detection unit for detecting another vehicle approaching the vehicle; and
a data processing unit for verifying whether changing to another lane on the roadway is possible and permissible for the vehicle as soon as an approaching vehicle is detected by the detection unit, wherein the data processing unit informs the driver of the vehicle about the other approaching vehicle in order to trigger a manual or autonomous lane change of the vehicle if a lane change to another lane of the same roadway is possible and permissible.

Further embodiments of the device according to the invention are also disclosed herein.

BRIEF DESCRIPTION OF THE DRAWINGS

Possible embodiments of the method according to the invention and of the device for supporting a lane change according to the invention are explained in greater detail below with reference to the appended figures, wherein:

FIG. 1 shows a block diagram of a possible embodiment of the device for supporting a lane change according to the invention;

FIG. 2 shows a further block diagram in order to represent a further exemplary embodiment of a device for supporting a lane change according to the invention;

FIG. 3 shows a further block diagram in order to represent a further exemplary embodiment of the device for supporting a lane change according to the invention;

FIG. 4 shows a flow chart in order to represent an embodiment example of the method for supporting a lane change according to the invention;

FIG. 5 shows a further flow chart in order to represent a further embodiment example of the method for supporting a lane change according to the invention;

DETAILED DESCRIPTION OF EXAMPLE EMBODIMENTS OF THE INVENTION

Figure 6:
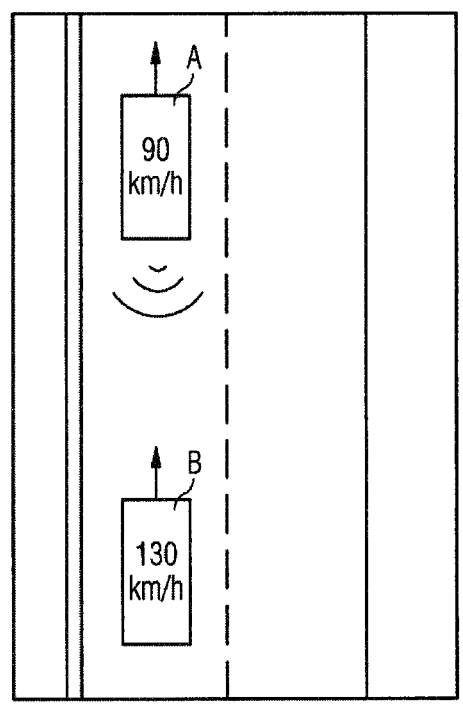
FIGS. 6, 7, 8 show schematic representations of possible driving situations in order to explain the mode of operation of the method according to the invention and of the device for supporting a lane change according to the invention.

As can be seen from FIG. 1, a device 1 for supporting a lane change for a vehicle according to the invention has, in the represented embodiment example, a detection unit 2 and a data processing unit 3. The device 1 provides support to a driver of a vehicle during a lane change of his vehicle. Here, the vehicle is located on a lane of a roadway, for example a multi-lane highway. The vehicle is moving in a driving direction along a lane on the roadway concerned. The device 1 represented in FIG. 1 forms, in one possible embodiment, part of a driver assistance system inside a vehicle, in particular a road vehicle. The detection unit 2 detects at least one other vehicle which is approaching the relevant vehicle of the driver from one direction. To this end, the detection unit 2 preferably has one or more sensor units which are located on various sides of the body of the vehicle. The detection unit 2 evaluates the sensor data in order to establish whether another vehicle is approaching. The approaching vehicle is notified, in one possible embodiment, by the detection unit 2 to the data processing unit 3 of the device 1. In one possible embodiment, the data processing unit 3 has one or more processors in order to evaluate the data, in particular sensor data. The data processing unit 3 preferably checks, in real time, whether changing to another lane of the same roadway is possible and permissible for the vehicle as soon as an approaching vehicle is captured or respectively detected by the detection unit 2. The data processing unit 3 informs the driver of the vehicle, for example via a user interface, about the other approaching vehicle in order to trigger or respectively bring about a manual or autonomous lane change of the vehicle if such a lane change to another lane of the same roadway is possible and permissible. In one possible embodiment of the device 1 according to the invention, the detection unit 2 additionally detects the side of the body of the vehicle which the other detected vehicle is approaching. In this embodiment, the detection unit 2 detects, for example, whether the other vehicle is approaching the ego vehicle from in front, from behind, from the left or from the right. If it is ascertained that the other vehicle is approaching the ego vehicle from behind, it is checked by the data processing unit 3, in one possible embodiment, whether a free lane is available on the right side of the ego vehicle which is continuing to move in the driving direction on the same roadway. In this case, the data processing unit 3 informs the driver of the vehicle, preferably via a user interface, about the vehicle approaching from behind and prompts the driver of the vehicle to make a lane change to the available free lane, i.e. to the free lane located on the right.

In one embodiment of the device according to the invention, the driver of the vehicle is prompted to make a lane change and the driver subsequently manually carries out the lane change himself by steering the vehicle. Alternatively, the data processing unit 3 can automatically or respectively autonomously make or respectively instigate the steering maneuver to the available free lane if this is permissible in accordance with the general traffic regulations and/or in accordance with the local traffic signs provided.

In one possible embodiment, the data processing unit 3 additionally checks whether an obstacle is present which would prevent a lane change of the vehicle to the respective other lane of the roadway. This obstacle is, for example, another vehicle located on the same roadway or a different obstacle, for example a temporarily erected traffic sign or the like. In one possible embodiment, the data processing unit 3 additionally calculates a relative speed between the measured driving speed of the vehicle concerned and the driving speed of the other approaching vehicle. In one possible embodiment, the driver of the vehicle is informed via a user interface about the calculated relative speed between the ego vehicle and the other approaching vehicle. Here, the driver is preferably additionally informed which side the other vehicle is approaching from. For example, the driver of the vehicle is informed that another vehicle is approaching his vehicle from behind at a relative speed of 50 km/h. In one possible embodiment of the device according to the invention, the lane change of the vehicle to a free lane of the same roadway is suggested or respectively proposed, or is automatically or respectively autonomously executed, as a function of the calculated relative speed between the ego vehicle and the other approaching vehicle. In one possible embodiment, the lane change is effected automatically or respectively autonomously, inasmuch as the calculated relative speed and the existing remaining distance between the two vehicles does not leave the driver of the vehicle enough time to make a lane change manually or respectively steered by the driver. If, for example, a vehicle is approaching the ego vehicle of the driver from one direction at such a high speed that the driver is not left with sufficient reaction time to change lanes, the lane change is preferably automatically initiated by the data processing unit 3, in that it controls the steering unit of the vehicle accordingly.

In a further possible embodiment of the device according to the invention, the lane change is effected autonomously as soon as the driver activates an autonomous lane change function via an input unit. In this embodiment, the driver is additionally informed acoustically or visually, when making a lane change, about the lane change. The driver is able to deactivate autonomous lane change functionality and is then prompted to make the lane change manually by the device 1 via a user interface as soon as the traffic situation necessitates this and a corresponding lane change is possible. The driver of a vehicle is, for example, prompted to make a lane change if the following conditions are satisfied:

Another vehicle which is approaching the vehicle at a relative speed, for example from behind, is captured or respectively recognized.

There exists a further lane, in particular on the right side of the roadway.

There is no obstacle on this lane which would prevent a lane change.

The recommendation to change lanes can, for example, be indicated to the driver on the instrument panel of the vehicle.

Furthermore, the driver of the vehicle can receive warning messages from the device 1 as a function of the urgency of the lane change to be made. These warning messages are preferably generated automatically as a function of the relative speed of the other vehicle and/or the direction from which the other vehicle is approaching. If, for example, the other vehicle is approaching at a high relative speed from behind, a first acoustic warning signal can be output via the user interface to the driver, whereas another acoustic warning signal is output to the driver if the other vehicle is approaching from the front at the same relative speed. The amplitude and frequency of the acoustic and/or visual warning signal can depend on the established relative speed and/or the direction of approach such that the driver can immediately recognize the urgency of a lane change which has to be made.

FIG. 2 shows a block diagram in order to represent a further embodiment example of the device for supporting a lane change according to the invention. In the embodiment example represented in FIG. 2, the detection unit 2 is connected to various sensor units 4-1, 4-2, 4-3, 4-4 which are located on various sides of the body of the vehicle concerned. The various sensor units 4-1, 4-2, 4-3, 4-4 are preferably located on the front, on the left and right sides as well as on the back of the vehicle body. The sensors 4-i are, for example, radar sensors of a radar system of the vehicle. By mounting radar sensors on various sides of the vehicle body, it is possible to detect the vehicle surroundings all round, i.e. with an angle of view of 360°. The radar system emits radar waves which are reflected by the approaching object or respectively vehicle and are detected by the sensor units 4-i. The radar sensor data or respectively radar sensor signals are supplied to the detection unit 2 for evaluation. The detection unit 2 evaluates the radar sensor data and can detect another vehicle approaching the vehicle with the aid thereof. The detection unit 2 can, in one possible embodiment, further establish the relative speed of the approaching vehicle by evaluating the radar signals or respectively radar sensor data which it obtains from the various radar sensor units 4-i. The detection unit 2 notifies the approaching vehicle to the data processing unit 3 which subsequently checks whether changing to another lane of the roadway is possible and permissible for the vehicle. In the embodiment represented in FIG. 2, the driver is informed about the approaching vehicle via a user interface 5 in order to thus bring about or respectively trigger a manual or autonomous lane change of the vehicle if such a lane change to another lane of the same roadway is possible and permissible.

FIG. 3 shows a block diagram of a further embodiment example of the device for supporting a lane change according to the invention. In the embodiment example represented in FIG. 3, the detection unit 2 receives information regarding obstacles which may prevent a possible lane change to a free lane from a further unit 6. These obstacles can, for example, be other vehicles on the roadway. The presence of obstacles on other lanes can be established with the aid of the same or other sensor technology. For example, obstacles on other lanes can also be recognized with the aid of vehicle cameras or different optical sensors. In one possible embodiment, if the obstacles are other vehicles on the same roadway, a relative speed between the vehicle and the moving obstacles is calculated by the data processing unit 3 of the device 1. In one possible embodiment, the ego driving speed of the vehicle is established via a speed sensor 7 and is supplied to the detection unit 2 of the device 1, as represented in FIG. 3. The data processing unit 3 informs the driver of the vehicle about the approach of the other vehicle, for example by means of the user interface 5, as represented in FIG. 3. Furthermore, the data processing unit 3 can output control signals to control a steering unit 8 of the vehicle in order to carry out or respectively support an automatic or respectively autonomous lane change.

FIG. 4 shows a flow chart in order to represent an embodiment example of the method for supporting a lane change for a vehicle according to the invention. Here, the vehicle is moving in a driving direction along a lane on a roadway.

In a first step S1, another vehicle approaching the vehicle is captured or respectively detected. This happens, for example, with the detection unit 2 represented in FIG. 1. As soon as an approaching vehicle is recognized in step S1, it is checked in step S2 whether changing to another lane of the same roadway is possible and permissible for the vehicle. If this is the case, the driver of the vehicle is informed in step S3 about the other approaching vehicle in order to trigger a manual or autonomous lane change of the vehicle if the lane change is possible and permissible.

FIG. 5 shows a flow chart in order to represent a further embodiment example of the method for supporting a lane change according to the invention. Here, the first three steps S1, S2, S3 are identical to the steps S1 to S3, as represented in FIG. 4. In the embodiment example represented in FIG. 5, the side of the body of the vehicle which the other vehicle is approaching is determined in a further step S4. For example, the detection unit 2 can detect or respectively capture whether the other vehicle is approaching from in front, from the left, from the right or from behind the vehicle. In a further step S5, a relative speed is calculated or respectively established between the measured driving speed of the vehicle and a measured driving speed of the other vehicle. In the embodiment example represented in FIG. 5, in step S6 the vehicle is additionally autonomously accelerated prior to or during the lane change to the free lane if the relative speed between the ego vehicle and another vehicle approaching from behind, which is calculated in step S5, exceeds a certain threshold, in order to prevent a collision of the two vehicles. Finally, a warning signal can be output prior to and/or during the lane change in a step S7 if the relative speed calculated in step 5 between the vehicle and the other detected vehicle, which is approaching from behind, exceeds a certain threshold. For example, the vehicle can output a flashing warning signal at its back during the lane change if another vehicle is approaching from behind at such a high driving speed that a lane change of the vehicle driving in front is absolutely essential in order to avoid a collision, and said lane change is steered manually by the driver of the vehicle driving in front or made autonomously by means of the controls.

Figure 7:
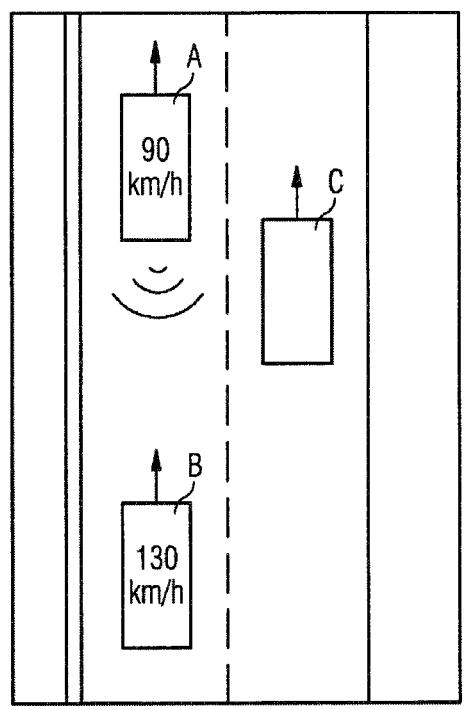
Figure 8:
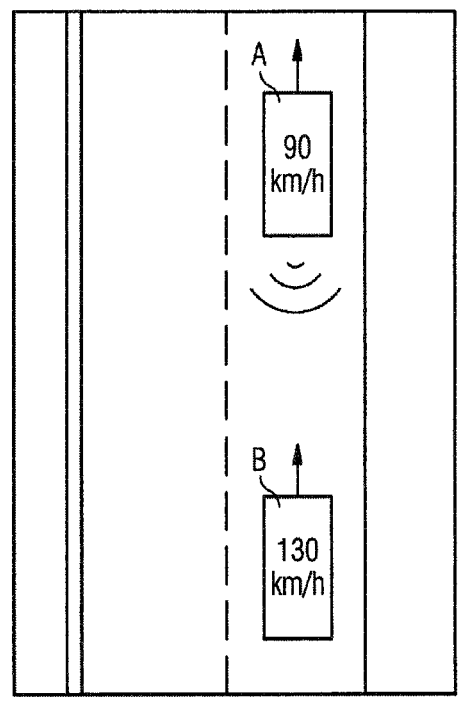

FIGS. 6, 7, 8 show various traffic situations in order to explain the mode of operation of the method according to the invention and of the device for supporting a lane change according to the invention.

In the traffic situation represented in FIG. 6, two vehicles A, B are moving on the overtaking lane of a two-lane highway in the same driving direction. Here, the vehicle B is approaching the vehicle driving in front A due to its higher driving speed. In the example represented in FIG. 6, the vehicle driving in front A is driving on the left lane at a speed of 90 km/h, while the vehicle B is approaching from behind at a driving speed of 130 km/h. The relative speed between the two vehicles A, B is accordingly 40 km/h. A sensor of the detection unit 2 inside the vehicle A driving in front recognizes the vehicle B approaching from behind and verifies whether changing to another lane of the roadway is possible and permissible. In the traffic situation represented in FIG. 6, the right lane is free so that a lane change of the vehicle A from the left overtaking lane to the right lane of the two-lane highway is easily possible. Therefore, in the traffic situation represented in FIG. 6, the lane change is either made manually by the driver of the vehicle A, after he has been informed about the approaching vehicle B, or the lane change is made automatically by the assistance system, wherein the lane change is preferably signaled to the driver via a driver interface. In one possible embodiment, the relative speed between the two vehicles A, B is calculated and the lane change is effected as a function of the calculated relative speed. The higher the relative speed of the two vehicles A, B in the traffic situation represented in FIG. 6, the more likely a need for the lane change is, and the quicker the lane change is proposed or respectively made by the assistance system. If, in the traffic situation represented in FIG. 6, the relative speed between the two vehicles A, B is higher than a specific adjustable threshold, such that there is a risk of collision between the two vehicles A, B, the vehicle driving in front A can, in one possible embodiment, be autonomously accelerated prior to and/or during the lane change in order to reduce the probability of a collision.

In the case of the traffic situation represented in FIG. 7, a third vehicle C, which has approximately the same speed as the vehicle driving in front A, is located on the right lane of the two-lane highway. In the case of the traffic situation represented in FIG. 7, the vehicle C on the right lane constitutes a moving obstacle which would prevent a lane change of the vehicle driving in front A to the right lane. In the case of the traffic situation represented in FIG. 7, the assistance system does not propose a lane change to the right lane, in order to exclude the possibility of a collision with the vehicle C.

In the case of the traffic situation represented in FIG. 8, both vehicles A, B are located on the right lane of a two-lane highway. In the case of the traffic situation represented in FIG. 8, an evasive maneuver of the vehicle A by means of a lane change is not possible, as the vehicle A is already located on the outermost right lane. In the case of the traffic situation represented in FIG. 8 a lane change is thus not permissible due to the general traffic regulations.

In the case of the method according to the invention and in the case of the device for supporting a lane change according to the invention, the traffic safety is increased, on the one hand, and the flow of traffic in a road system is increased, on the other hand. Moreover, the pressure on the driver is relieved in constant traffic. The vehicles can be any vehicles, in particular road vehicles, for example cars, trucks or motorcycles. Further embodiments of the method according to the invention and of the device according to the invention are possible. In one possible embodiment, the appropriate indicator is automatically activated during a lane change, in order to indicate the lane change to other road users. In a further embodiment, a wireless communication link exists between the various vehicles or respectively road users, for example via a radio interface. In one possible embodiment of the method according to the invention and of the device for supporting the lane change according to the invention, the lane change is additionally communicated to other road users via the communication interface. If, for example, in the case of the traffic situation represented in FIG. 6, the road user in vehicle B is approaching the vehicle A driving in front at a relatively high speed, the latter's assistance system can propose the lane change to the right lane to the driver of the vehicle A, or respectively make said change autonomously, and simultaneously notify the lane change to the vehicle B approaching from behind via the communication interface. The assistance system of the vehicle A can preferably simultaneously turn on a right indicator in order to indicate the lane change to the right lane. The turned-on indicator of the vehicle A driving in front can, in one possible embodiment, be recognized by the driver assistance system of the approaching vehicle B. Moreover, in one possible embodiment, the lane change notified by the vehicle A via the communication interface can additionally be captured by the driver assistance system of the vehicle B. In the case of this traffic situation, the driver of the vehicle B is able to dispense with a braking maneuver or respectively even accelerate his vehicle B, since the vehicle B can assume that the vehicle A driving in front is making a lane change. Conversely, the driver assistance system of the vehicle A driving in front can, for example, in the case of the traffic situation represented in FIG. 7, communicate the fact that a lane change to the right lane is not currently possible (due to the vehicle C driving adjacent to it) to the following vehicle B via the communication interface. In this traffic situation, the driver of the vehicle B is forced to brake in order to prevent a pileup or a collision.

The use of the method according to the invention and the device according to the invention is not limited to the traffic situations represented in FIGS. 6, 7, 8. For example, the method according to the invention can also be used in traffic situations, in which vehicles are approaching the ego vehicle from other sides, in particular from in front. If, for example, a wrong-way driver is approaching a vehicle driving on the overtaking lane of a highway, a lane change to the right lane and, in an emergency, to the shoulder can automatically be triggered with the method according to the invention and the device according to the invention. If, in this traffic situation, a wrong-way driver is recognized by the device according to the invention or respectively the method according to the invention, this can, in one possible embodiment, be notified to a traffic control center. Consequently, in this embodiment, not only is the driver informed about the oncoming vehicle in order to make the lane change, but also a traffic control center which can initiate further measures. In this embodiment, the device according to the invention consequently also forms a protection device against collisions with wrong-way drivers.

REFERENCE NUMERALS

1 Device for supporting a lane change
2 Detection unit
3 Data processing unit
4 Sensor unit
5 User interface
6 Obstacle indicating unit
7 Speed sensor
8 Steering unit

The invention claimed is:

1. A method of supporting a lane change of a subject vehicle moving in a driving direction along a lane of a roadway,
wherein the method comprises the following steps:
based on sensor data, detecting an other vehicle that is approaching the subject vehicle from behind the subject vehicle on the lane along which the subject vehicle is moving;
with a data processing unit, checking whether a lane change to an other lane of the roadway is possible and permissible for the subject vehicle, after the other vehicle is detected;

with the data processing unit, calculating a relative speed as a result of subtracting a measured driving speed of the subject vehicle from a measured driving speed of the other vehicle, and comparing the relative speed to a predefined minimum threshold;

with the data processing unit, informing a driver of the subject vehicle that the other vehicle is approaching and prompting the driver of the subject vehicle to manually perform the lane change of the subject vehicle to the other lane, or autonomously performing the lane change of the subject vehicle to the other lane, when the lane change to the other lane is possible and permissible; and when the relative speed exceeds the predefined minimum threshold, then in response thereto with the data processing unit autonomously accelerating the subject vehicle prior to and/or during the lane change to avoid a collision between the subject vehicle and the other vehicle.

2. The method according to claim 1, further comprising checking whether a free lane exists on a right side of the subject vehicle on the roadway in the driving direction of the subject vehicle, and when affirmative, informing the driver of the subject vehicle about the other vehicle and prompting the driver to manually perform the lane change to the free lane.

3. The method according to claim 1, wherein the checking of whether the lane change is possible and permissible comprises checking whether the other lane exists in the driving direction of the subject vehicle and, when affirmative, checking whether there is an obstacle that would prevent the lane change of the subject vehicle to the other lane.

4. The method according to claim 1, further comprising informing the driver of the subject vehicle about the relative speed.

5. The method according to claim 1, wherein the lane change of the subject vehicle is prompted or autonomously performed as a function of the relative speed.

6. The method according to claim 1, further comprising triggering a warning signal prior to or during the lane change by the subject vehicle when the relative speed exceeds the predefined minimum threshold.

7. The method according to claim 1, wherein the measured driving speed of the subject vehicle is a speed of the subject vehicle moving in the driving direction along the lane, and the measured driving speed of the other vehicle is a speed of the other vehicle driving in the driving direction along the lane.

8. The method according to claim 1, wherein the method comprises the informing of the driver of the subject vehicle that the other vehicle is approaching and the prompting of the driver of the subject vehicle to manually perform the lane change of the subject vehicle to the other lane when the lane change to the other lane is possible and permissible.

9. The method according to claim 1, wherein the method comprises the autonomous performing of the lane change of the subject vehicle to the other lane when the lane change to the other lane is possible and permissible.

10. The method according to claim 1, wherein the autonomous accelerating of the subject vehicle is performed prior to the lane change.

11. The method according to claim 1, wherein the autonomous accelerating of the subject vehicle is performed during the lane change.

12. A device for supporting a lane change for a subject vehicle moving in a driving direction along a lane of a roadway, said device comprising:
  a detection unit configured and adapted to detect an other vehicle that is approaching the subject vehicle from behind the subject vehicle on the lane along which the subject vehicle is moving; and
  a data processing unit, which is configured and adapted:
    to check whether a lane change to an other lane of the roadway is possible and permissible for the subject vehicle, after the other vehicle is detected by the detection unit,
    to inform a driver of the subject vehicle that the other vehicle is approaching and prompt the driver of the subject vehicle to manually perform the lane change of the subject vehicle to the other lane, or to autonomously perform the lane change of the subject vehicle to the other lane, when the lane change to the other lane is possible and permissible,
    to calculate a relative speed as a result of subtracting a measured driving speed of the subject vehicle from a measured driving speed of the other vehicle, and to compare the relative speed to a predefined minimum threshold, and
    to autonomously accelerate the subject vehicle prior to and/or during the lane change, when and in response to the relative speed exceeding the predefined minimum threshold, to avoid a collision between the subject vehicle and the other vehicle.

13. The device according to claim 12,
  wherein the data processing unit is further configured and adapted to check whether a free lane exists on a right side of the subject vehicle on the roadway in the driving direction of the subject vehicle, and
  wherein the data processing unit is configured and adapted to inform the driver of the subject vehicle about the other vehicle and prompt the driver to manually perform the lane change to the free lane, when the free lane exists.

14. The device according to claim 12, wherein, to check whether the lane change to the other lane is possible and permissible, the data processing unit is configured and adapted to check whether the other lane exists in the driving direction of the subject vehicle and, when affirmative, to check whether there is an obstacle that would prevent the lane change of the subject vehicle to the other lane.

15. The device according to claim 12, wherein the data processing unit is further configured and adapted to communicate the relative speed to the driver of the subject vehicle.

16. The device according to claim 12, wherein the data processing unit is configured to inform the driver of the subject vehicle that the other vehicle is approaching and prompt the driver of the subject vehicle to manually perform the lane change of the subject vehicle to the other lane when the lane change to the other lane is possible and permissible.

17. The device according to claim 12, wherein the data processing unit is configured to autonomously perform the lane change of the subject vehicle to the other lane when the lane change to the other lane is possible and permissible.

18. The device according to claim 12, wherein the data processing unit is configured to autonomously accelerate the subject vehicle prior to the lane change.

19. The device according to claim 12, wherein the data processing unit is configured to autonomously accelerate the subject vehicle during the lane change.

* * * * *